US007963797B2

(12) United States Patent
Knappe

(10) Patent No.: US 7,963,797 B2
(45) Date of Patent: Jun. 21, 2011

(54) CONSOLE FOR MEDICAL SUPPLY

(75) Inventor: Stefan Knappe, Burghaun (DE)

(73) Assignee: Ondal Holding GmbH, Huenfeld (DE)

( * ) Notice: Subject to any disclaimer, the term of this patent is extended or adjusted under 35 U.S.C. 154(b) by 710 days.

(21) Appl. No.: 11/599,214

(22) Filed: Nov. 14, 2006

(65) Prior Publication Data
US 2007/0184695 A1 Aug. 9, 2007

(30) Foreign Application Priority Data

Nov. 14, 2005 (EP) ..................... 05024821

(51) Int. Cl.
*H01R 35/00* (2006.01)
(52) U.S. Cl. ..................... 439/534; 439/540.1
(58) Field of Classification Search .................. 439/533, 439/534, 540.1, 713–715
See application file for complete search history.

(56) References Cited

U.S. PATENT DOCUMENTS

| 4,523,683 | A  | * | 6/1985 | Fullenkamp et al. | ......... 211/190 |
| 6,593,528 | B2 | * | 7/2003 | Franklin-Lees et al. | ......... 174/58 |
| 7,114,994 | B2 | * | 10/2006 | Garnett et al. | ................. 439/638 |
| 7,220,145 | B2 | * | 5/2007 | Denovich et al. | .......... 439/540.1 |

* cited by examiner

*Primary Examiner* — Khiem Nguyen
(74) *Attorney, Agent, or Firm* — Michael J. Striker

(57) ABSTRACT

A console (1) with a vertically arranged support frame (2) and with multiple jacks (3,4,29) for medical-technological supply. A first vertically arranged column (6) is arranged on a first side (5) of the support frame (2), and a second vertically arranged column (8) is arranged on a second opposing side (7), each with three modules (9.1-9.3,9.4-9.6) positioned on top of each other. The modules (9.1-9.6) consist of sections (10,10.1) of an extrusion profile (11,11.1). The extrusion profile (11,11.1) has a first and a second side wall (12,13) of equal width (14) at a right angle. A first channel (16) is arranged in a first end area (15) of the first side wall (12), a second channel (18) is arranged in a second end area (17) of the second sidewall (13), and a third channel (21) is arranged in an edge area (19) of an angle edge (20), each with a circular cross-section. The upper and lower cover plates (22,23) each have an extension (26) on the side (25) of the modules (1-9.3; 9.4-9.6) that is open; the extensions (26) all have a pivot bearing (27) and are flexibly connected to the support frame (2) with an individual joint (28) (FIGS. 29-31) to swivel the first and the second column (6,8) away from the support frame (2).

7 Claims, 17 Drawing Sheets

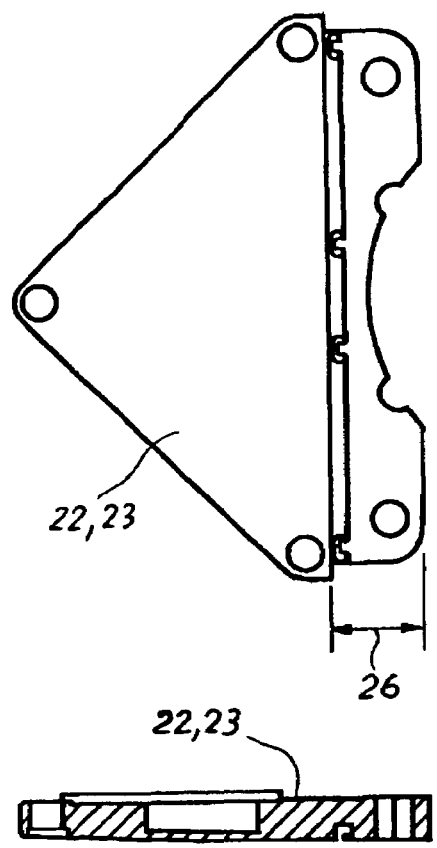
FIG. 15
FIG. 16
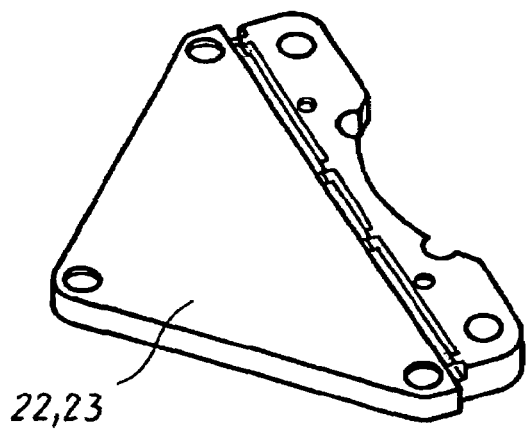
FIG. 14
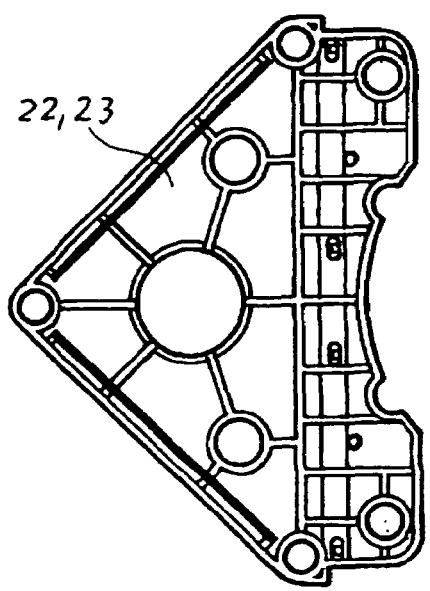
FIG. 17

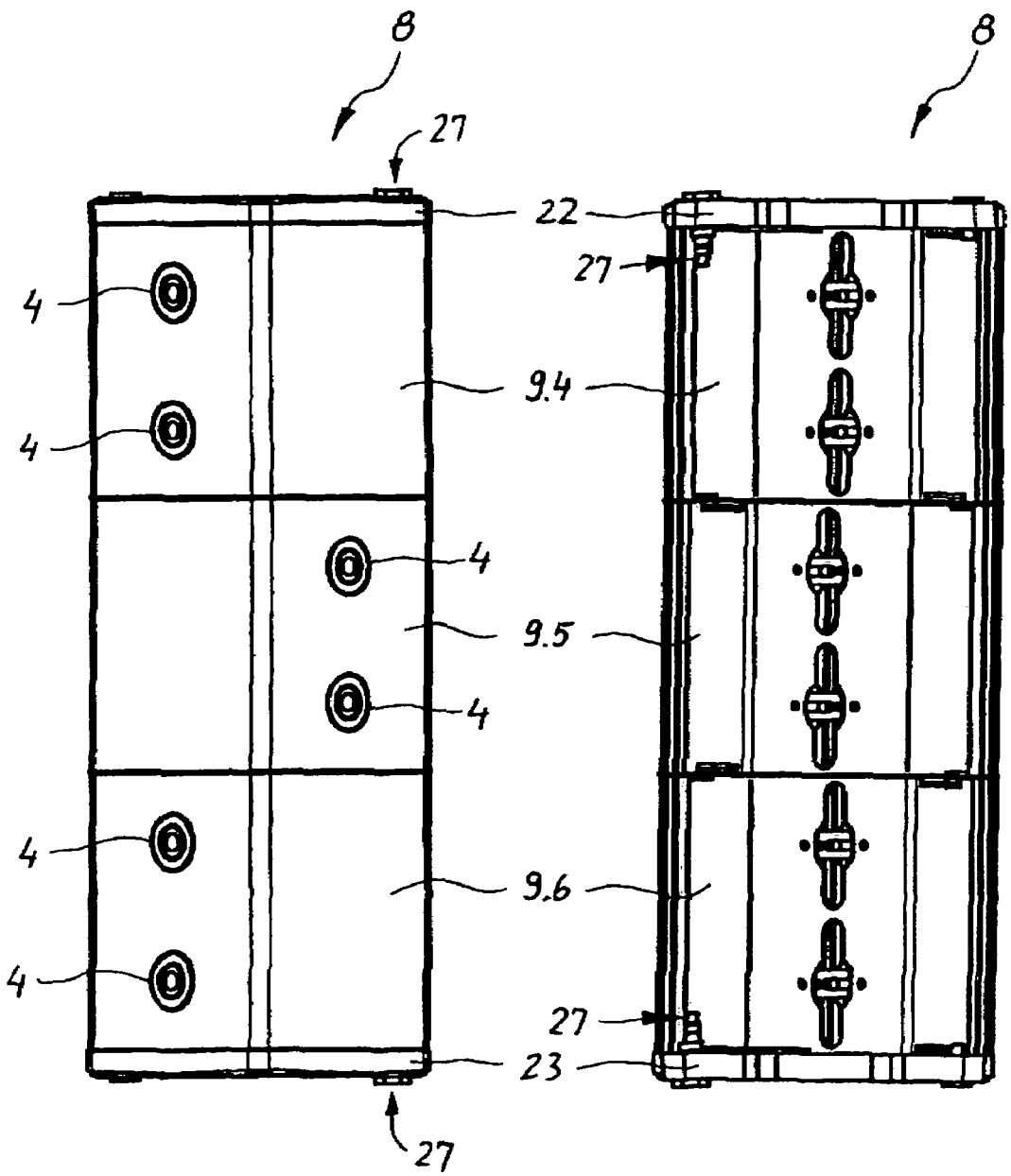

CONSOLE FOR MEDICAL SUPPLY

The invention relates to a console comprising a vertically arranged support frame and multiple jacks for medical-technological supply.

These types of consoles are known in a multitude of different embodiments, for example in German Patent Application No. 3,106,255 A1.

The object of the invention was to obtain a generically equivalent console that enables economical preproduction and manufacture of optional jacks and simple assembly and simple maintenance work.

The invention is explained in more detail on the basis of an exemplary embodiment using 33 figures (some in a schematic representation).

The following is shown:

FIGS. 14-17 show various views of a cover plate;

FIGS. 25-28 show various views of the column according to FIG. 21;

Figure 1:
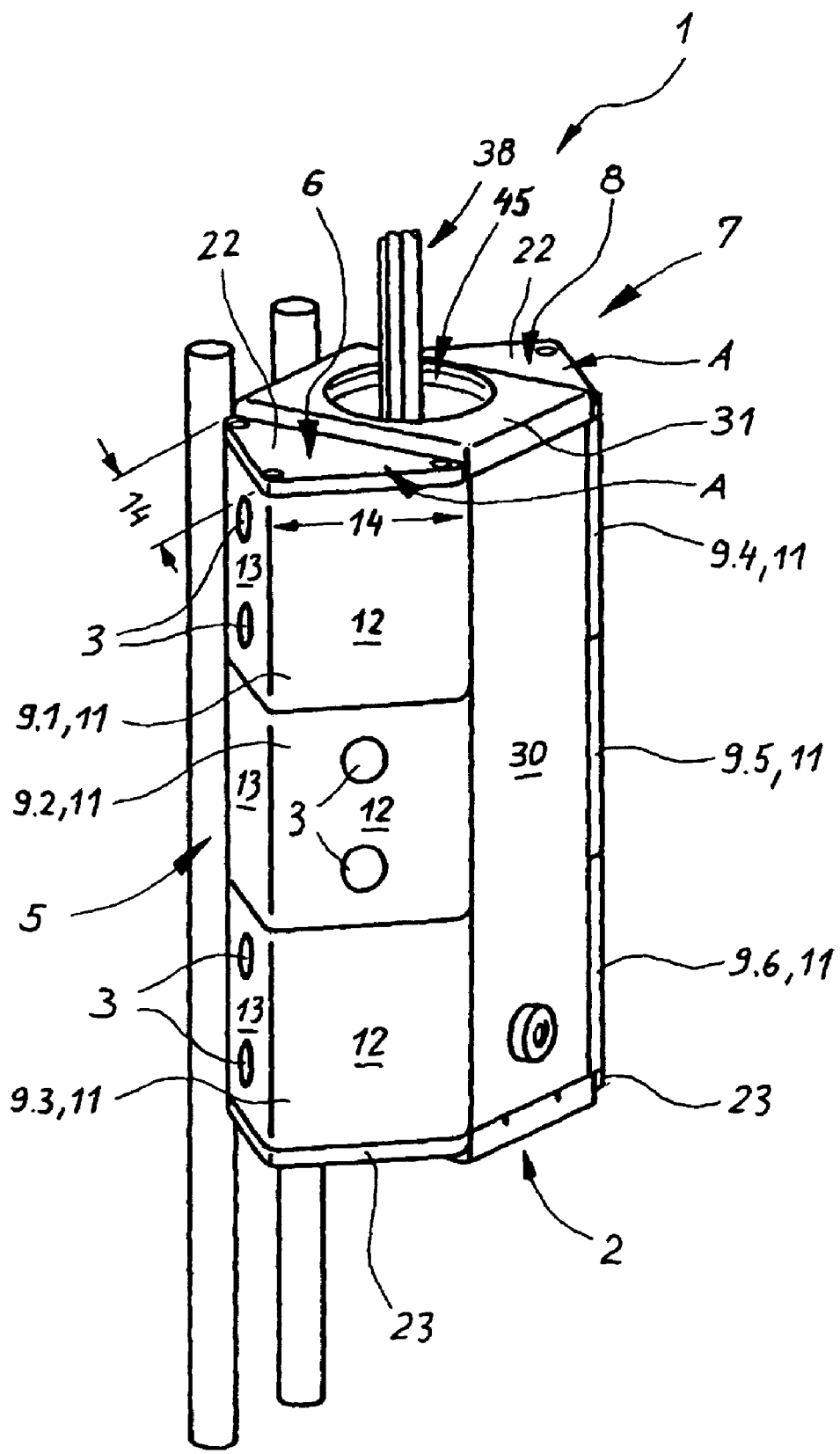
FIG. 1 shows a perspective view of a console with a support frame on which a column with modules is arranged on each of two opposing sides.

FIG. 1 shows a console 1 with a vertically arranged support frame 2 and with multiple jacks 3,4,29 for medical-technological supply.

A first vertically arranged column 6 is arranged on a first side 5 of the support frame 2, and a second vertically arranged column 8 is arranged on a second opposing side 7, each with three modules 9.1-9.3, 9.4-9.6 positioned on top of each other.

The modules 9.1-9.6 are optionally provided with jacks 3,4,29.

The modules 9.1-9.6 consist of sections 10,10.1 of an extrusion profile 11,11.1.

The extrusion profile 11,11.1 has a first and a second side wall 12,13 of equal width 14 at a right angle.

A first channel 16 is arranged in a first end area 15 of the first side wall 12, a second channel 18 is arranged in a second end area 17 of the second side wall 13, and a third channel 21 is arranged in an edge area 19 of an angle edge 20, each with a circular cross-section.

All modules 9.1-9.3; 9.4-9.6 of the first and the second column 6,8 are securely connected to an upper and a lower cover plate 22,23 each with a threaded rod 24 through all the channels 16,18,21.

The upper and lower cover plates 22,23 each have an extension 26 on the side 25 of the modules 1-9.3;9.4-9.6 that is open; the extensions 26 all have a pivot bearing 27 and are flexibly connected to the support frame 2 with an individual joint 28 (FIGS. 29-31) to swivel the first and the second column 6,8 away from the support frame 2.

The open sides 25 of the modules 9.1-9.3;9.4-9.6 are in a swiveled-in position A on a first or second side 5,7 of the support frame 2.

To connect to a tripod stand 35 (FIG. 33), an upper part of the support frame 2 has a stand-connection receptacle 45.

Figure 2:
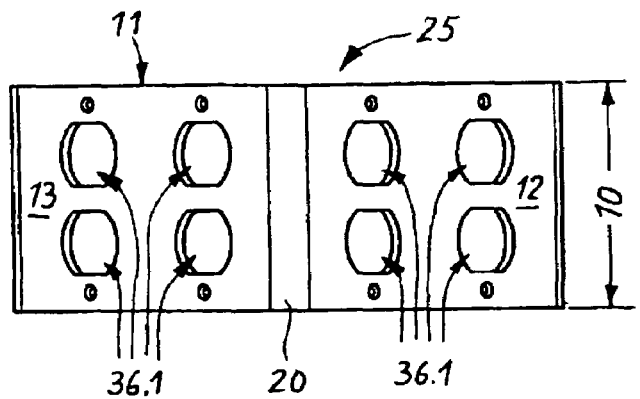
FIGS. 2-7 show various views of a first module.
Figure 3:
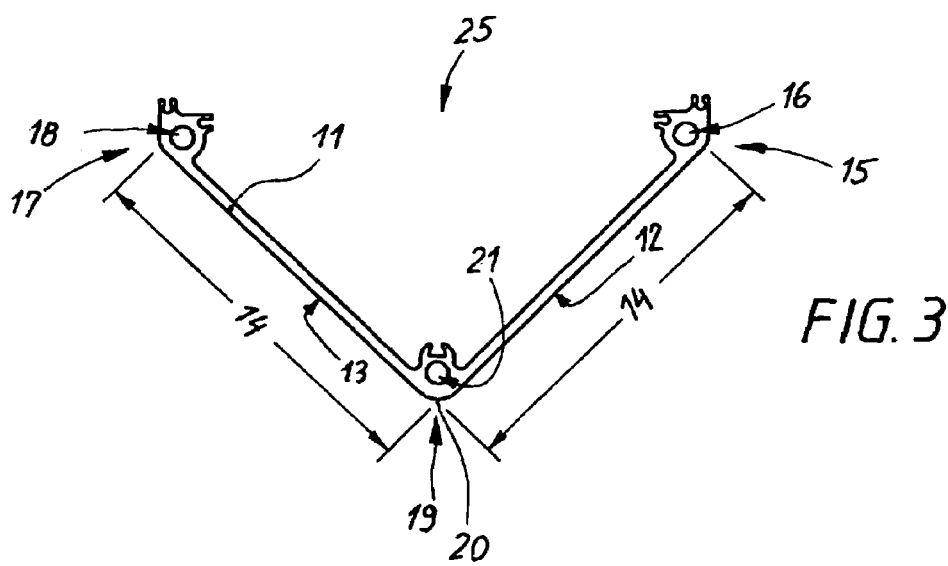
Figure 4:
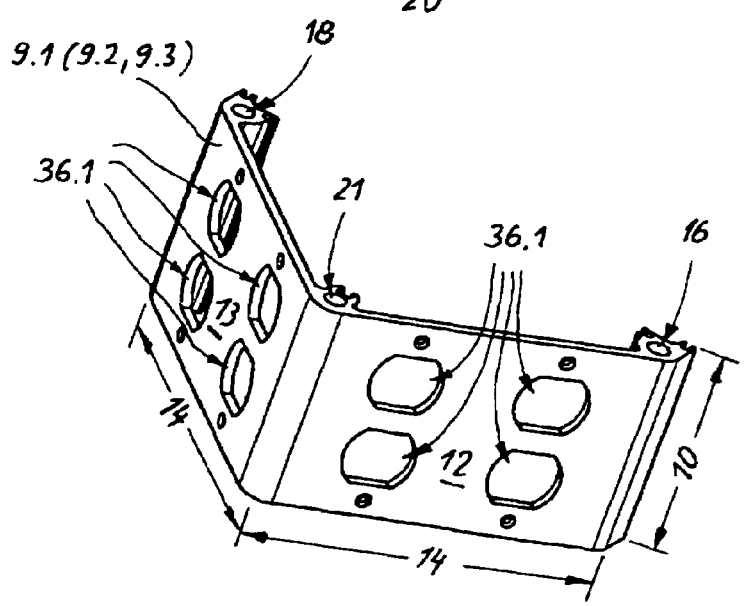
Figure 5:
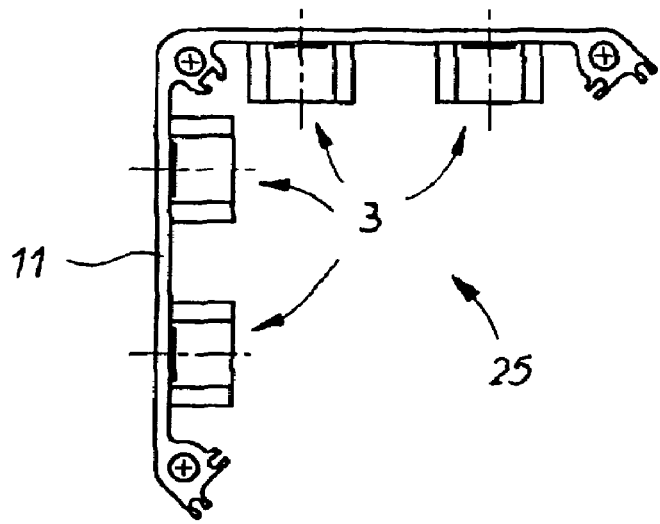
Figure 6:
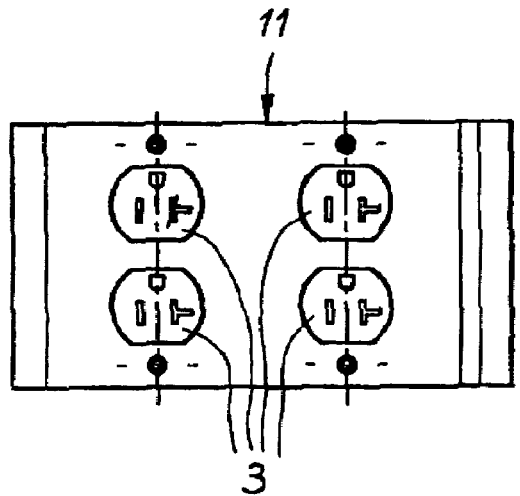
Figure 7:
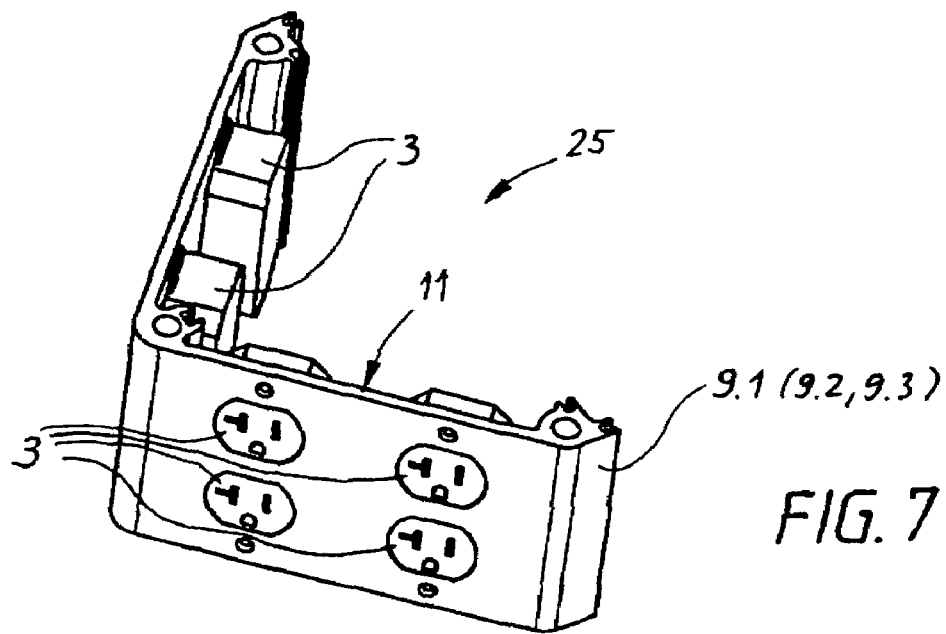
Figure 21:
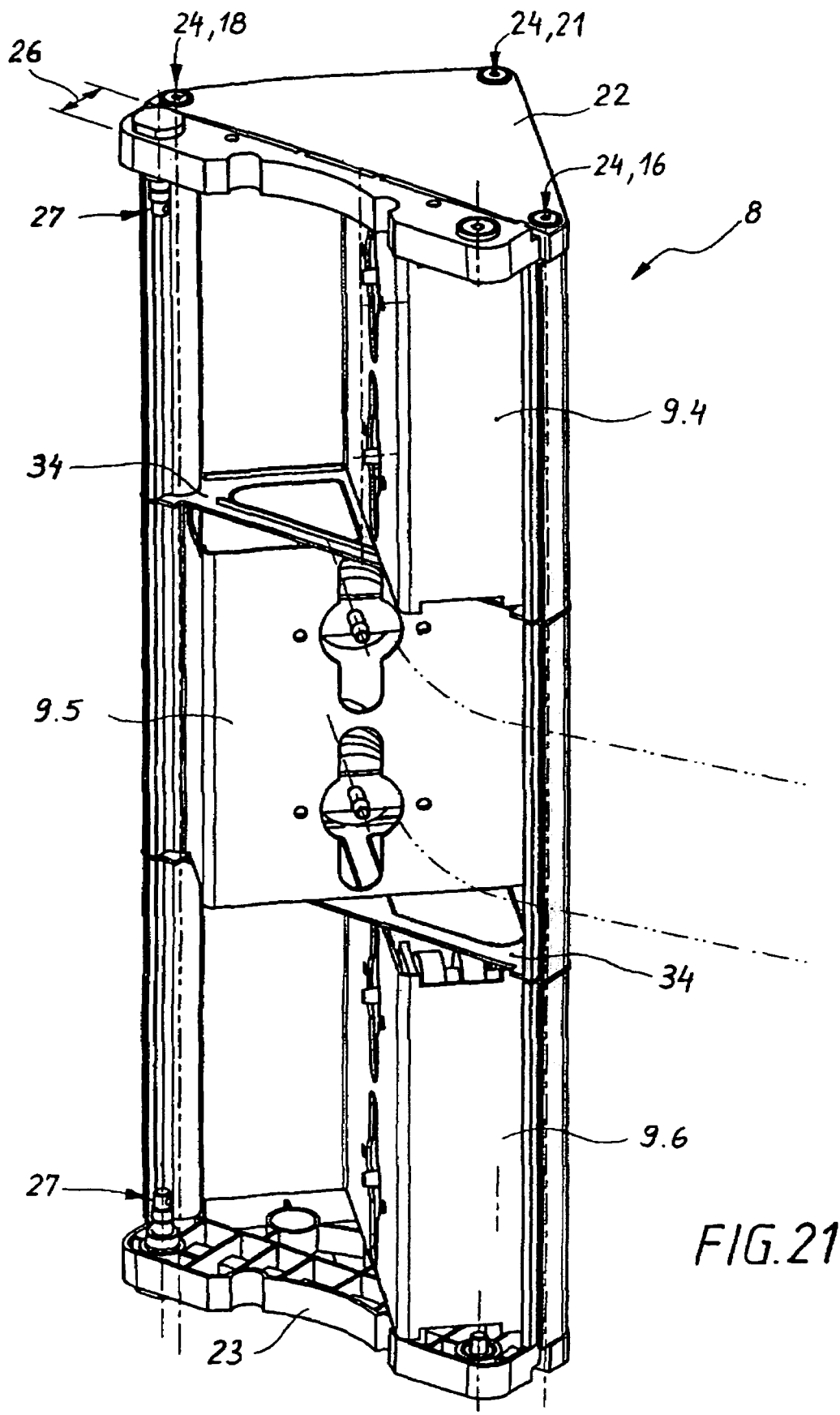
FIG. 21 shows a perspective view of an individual column with multiple modules.

FIGS. 2 through 7 show various views of a first, second, and third module 9.1-9.3. The modules 9.1-9.3 consist of sections 10 of an extrusion profile 11. The extrusion profile 11 has a first and a second side wall 12,13 of equal width 14 at a right angle. A first channel 16 is arranged in a first end area 15 of the first side wall 12, a second channel 18 is arranged in a second end area 17 of the second side wall 13, and a third channel 21 is arranged in an edge area 19 of an angle edge 20, each with a circular cross-section. Each channel 15,18,21 is used as a receptacle for a threaded rod 24 to connect the modules 9.1-9.3;9.4-9.6 via an upper and lower cover plate 22,23 (FIGS. 1 and 21). The sections 10 according to FIGS. 2 and 4 are already provided with first openings 36 in this case to receive first jacks 3 for a power supply. The sections 10 according to FIGS. 5 through 7 are already provided with first jacks 3 for a power supply in this case.

Figure 8:
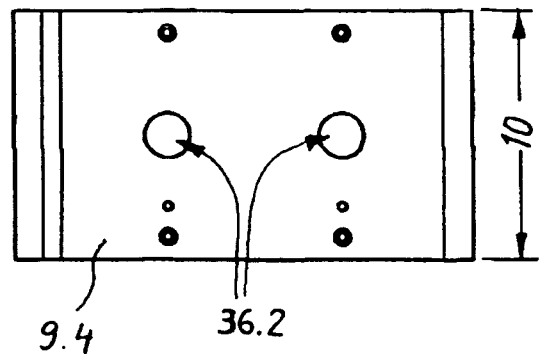
FIGS. 8-13 show various views of a second module.
Figure 9:
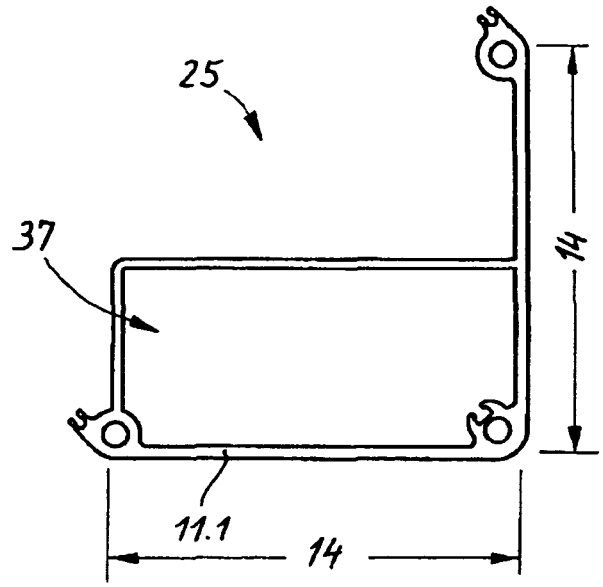
Figure 10:
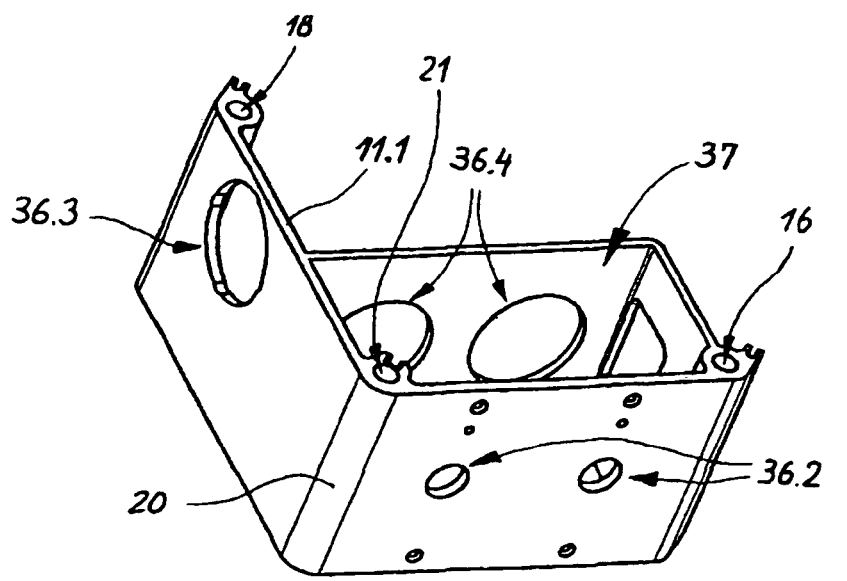
Figure 11:
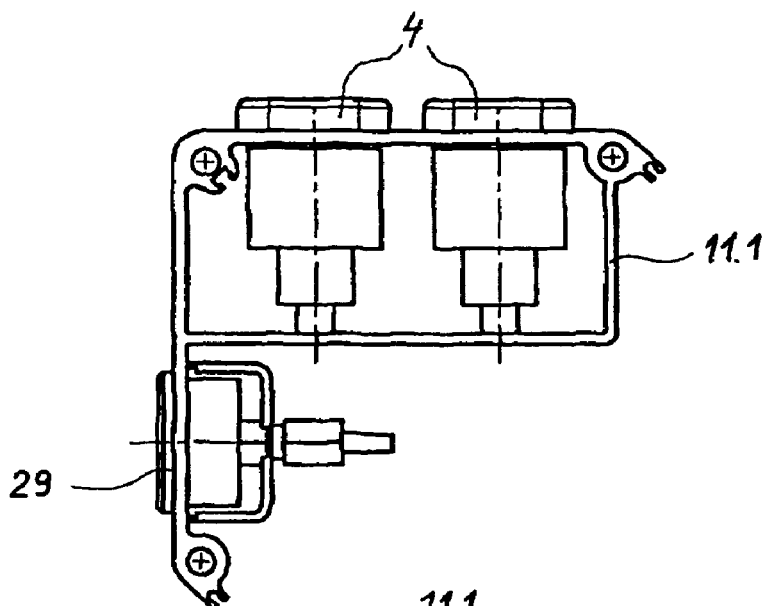
Figure 12:
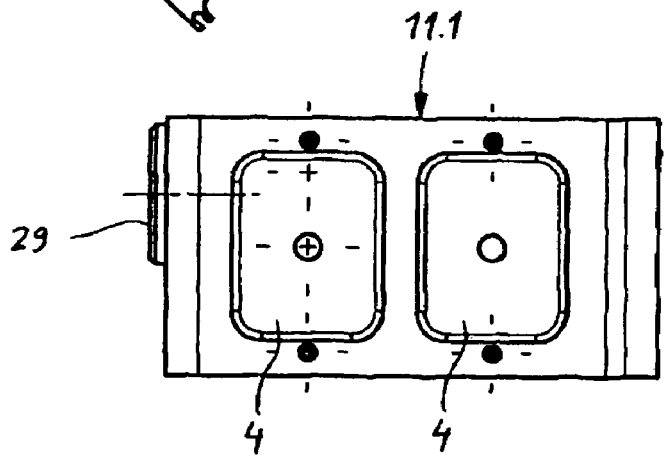
Figure 13:
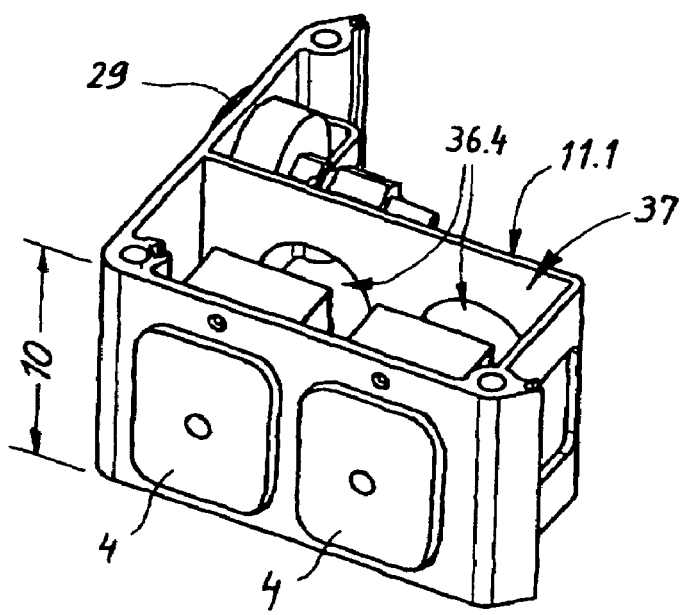

FIGS. 8 through 13 show various views of a fourth, fifth, and sixth module 9.4-9.6. The modules 9.4-9.6 consist of sections 10 of a second extrusion profile 11.1. The second extrusion profile 11.1 has a first and a second side wall 12,13 of equal width 14 at a right angle. A first channel 16 is arranged in a first end area 15 of the first side wall 12, a second channel 18 is arranged in a second end area 17 of the second side wall 13, and a third channel 21 is arranged in an edge area 19 of an angle edge 20, each with a circular cross-section. Each channel 15,18,21 is used as a receptacle for a threaded rod 24 to connect the modules 9.4-9.6 via an upper and lower cover plate 22,23 (FIGS. 1 and 21). The sections 10 according to FIGS. 8 and 10 are already provided with second openings 36.1 in this case to receive second jacks 4 for a gas supply and with a third opening 36.2 to receive a third jack 29 for electronic communication technology. The sections 10 according to FIGS. 11 through 13 are already provided with two second jacks in this case for a power supply and provided with a third jack 29 for electronic communication technology (for example for a video camera, monitor, etc.). The second extrusion profile 11.1 according to FIGS. 8 through 13 differs from the first extrusion profile 11 as per FIGS. 2 through 7 in that, in this case, the second extrusion profile 11.1 is provided with a (rectangular) channel 37, whereby a spatial separation (also in accordance with various regulations) is achieved among different jacks 3,4,29 with corresponding lines 38.

FIGS. 14 through 17 show various views of upper or lower cover plates 22,23, which are each identical to one another and manufactured from one tool.

Figure 18:
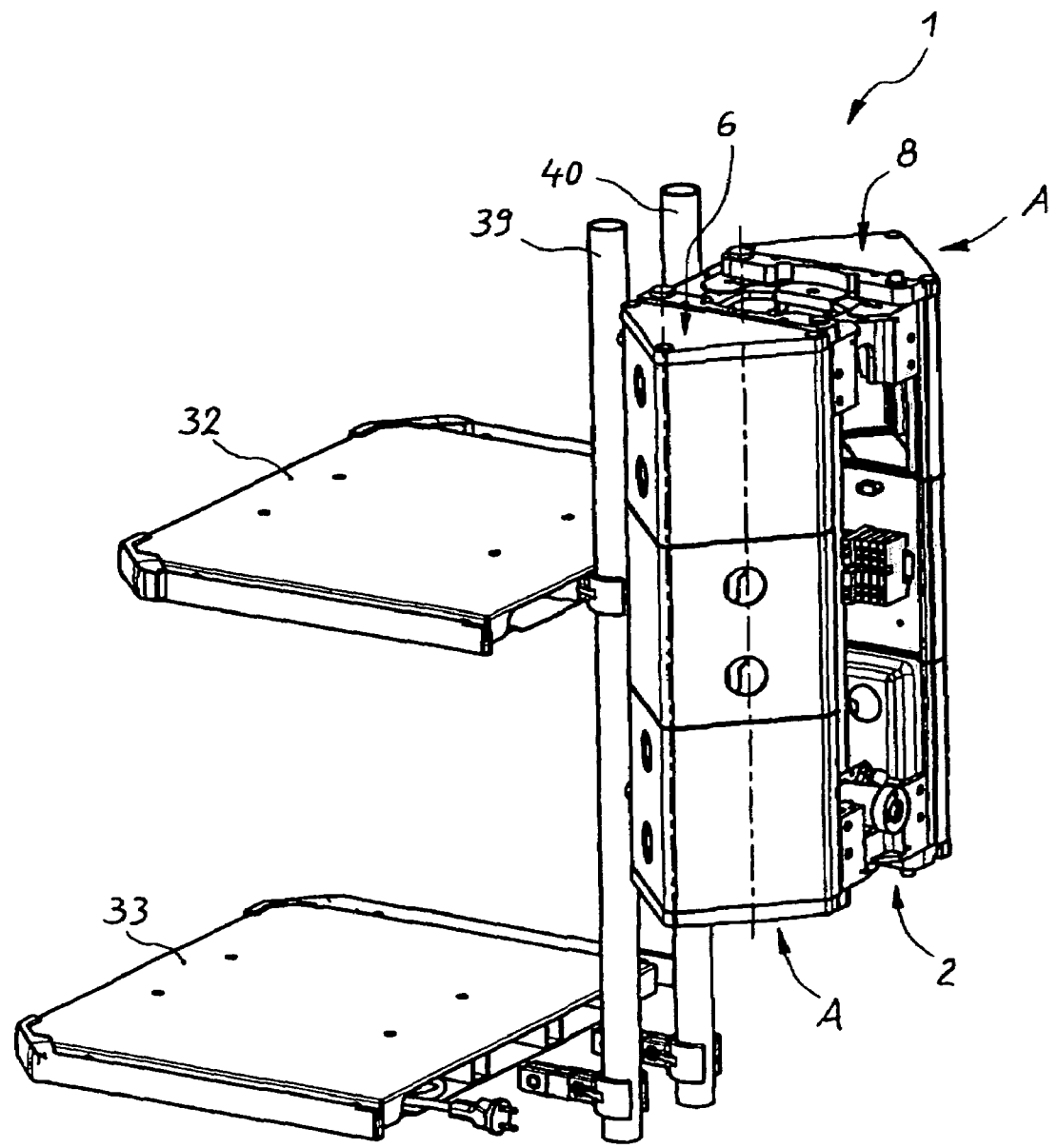
FIG. 18 shows the console as in FIG. 1, but without a casing of the frame and with two trays.

FIG. 18 shows the console 1 as per FIG. 1, without the casing 30 and without the protective cover 31 (FIG. 1) of the frame 2, but with two trays 32,33.

Figure 19:
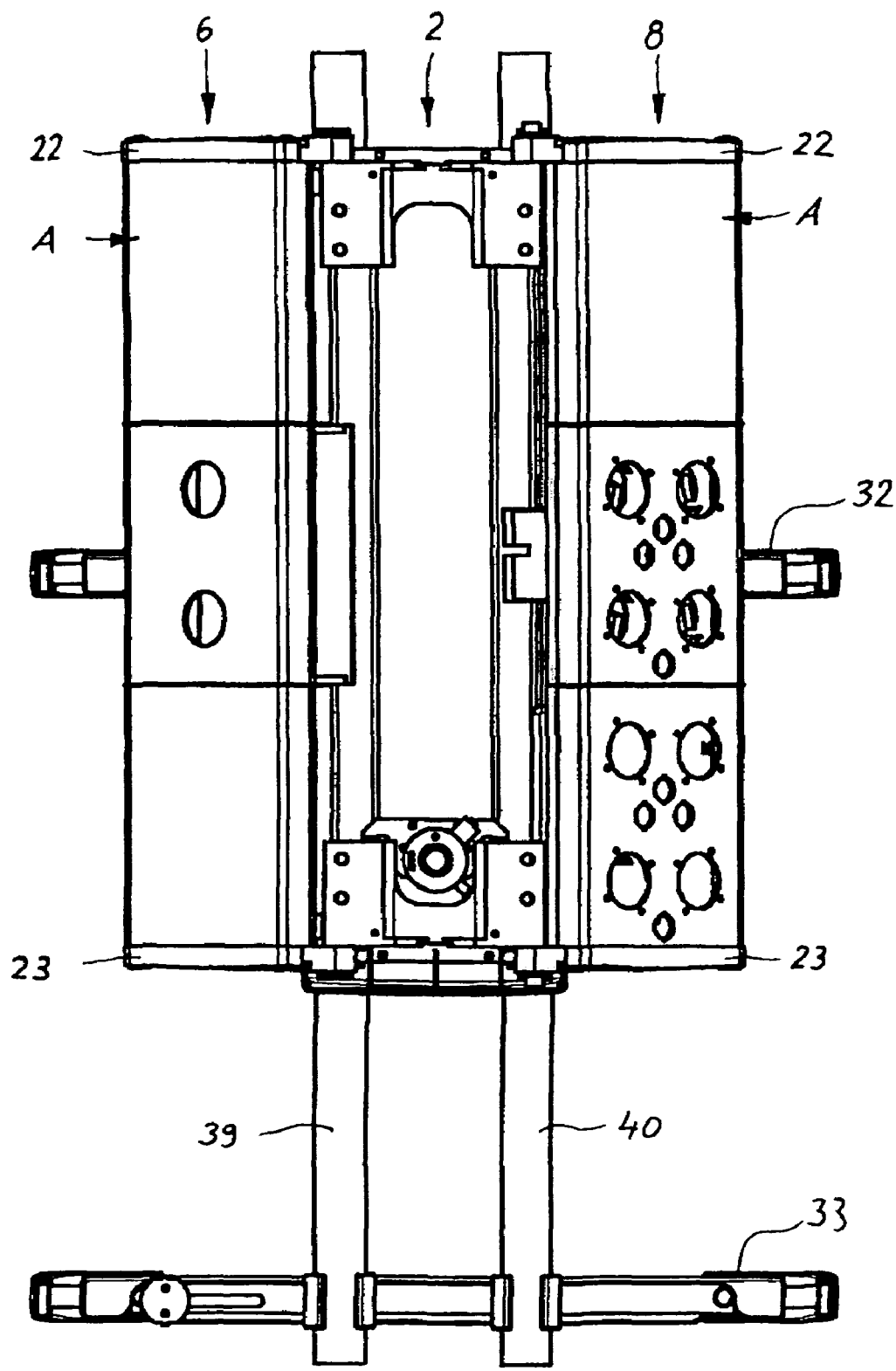
FIG. 19 shows a side view of the console according to FIG. 18, but of the back side of the trays.

FIG. 19 shows a side view of the console 1 according to FIG. 18, but with the back side of the trays 32,33.

Figure 20:
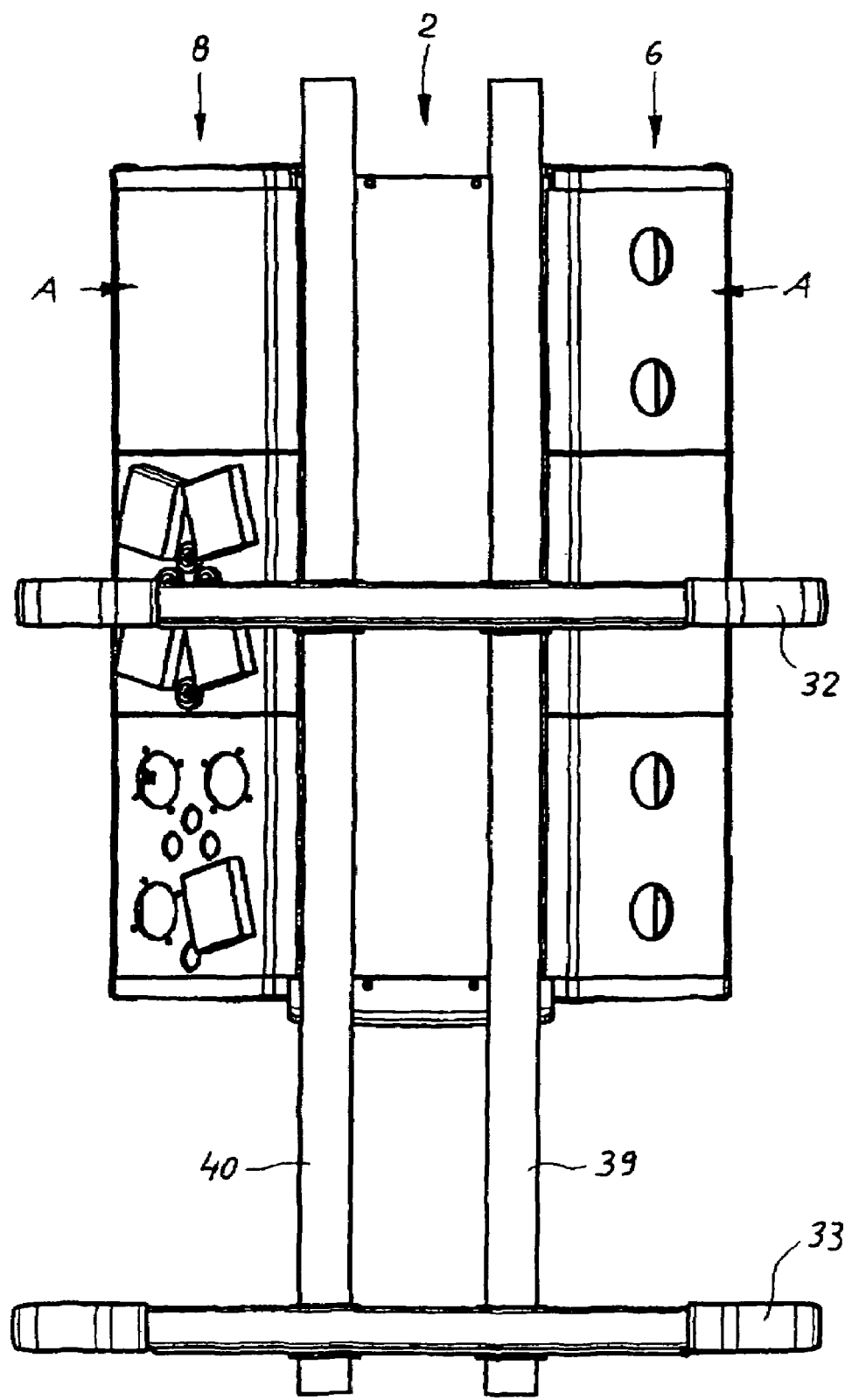
FIG. 20 shows the console according to FIG. 19, but from an opposing side.

FIG. 20 shows the console 1 according to FIG. 19, but from an opposing side;

FIG. 21 shows a perspective view of an individual second column 8 with three modules 9.4-9.6.

Figure 22:
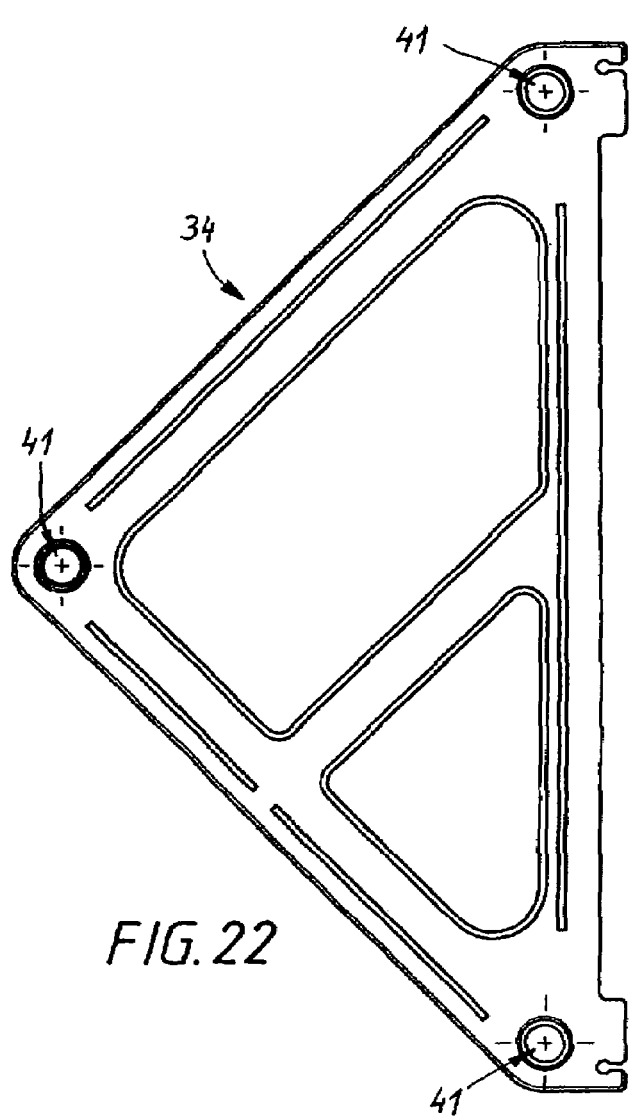
FIGS. 22-24 show various views of a separating plate.
Figure 23:
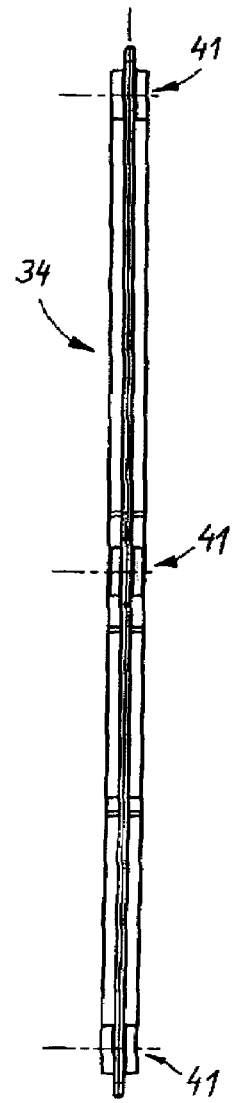
Figure 24:
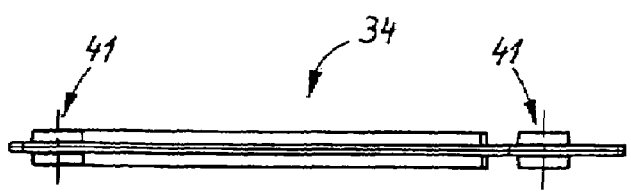
Figure 27:
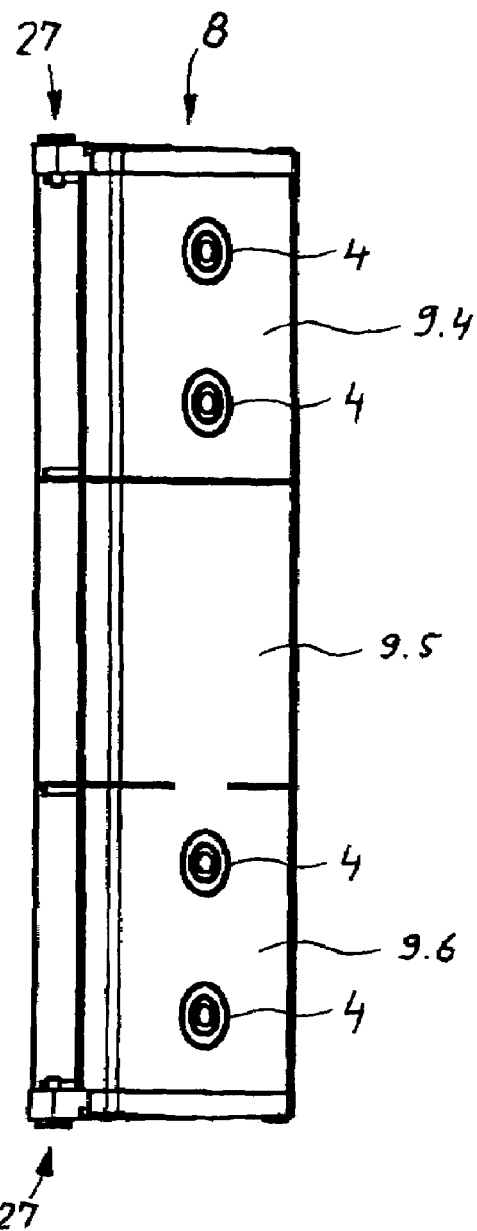
Figure 28:
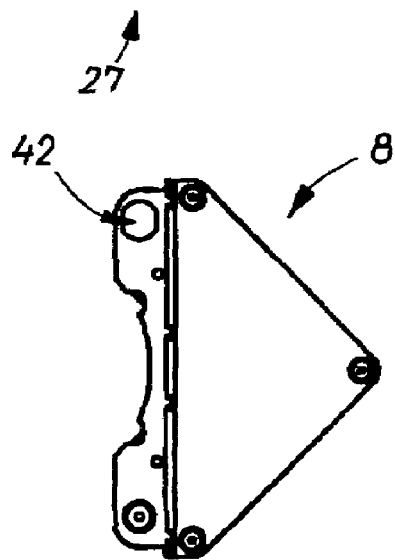

FIGS. 22 through 24 show various views of a separating plate 34.

FIGS. 25 through 28 show various views of the column 1 according to FIG. 21.

Figure 29:
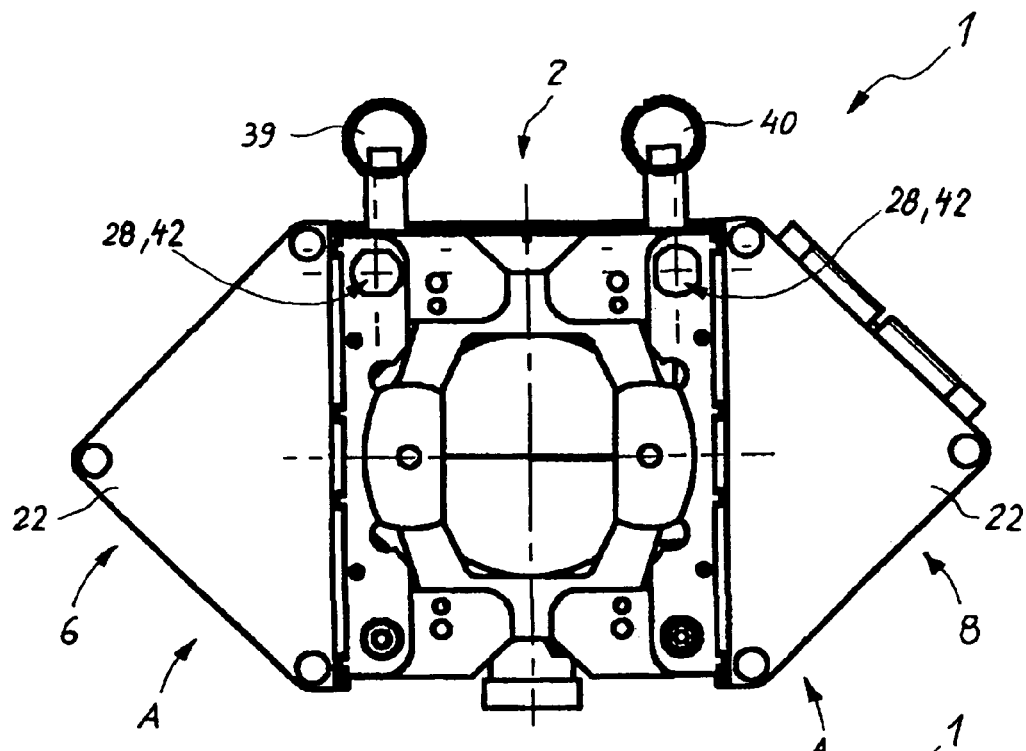
FIG. 29 shows the console according to FIG. 19, but in a top view and without trays.

FIG. 29 shows the console 1 in a closed position A according to FIG. 19, but in a top view and without the two trays 32,33.

Figure 30:
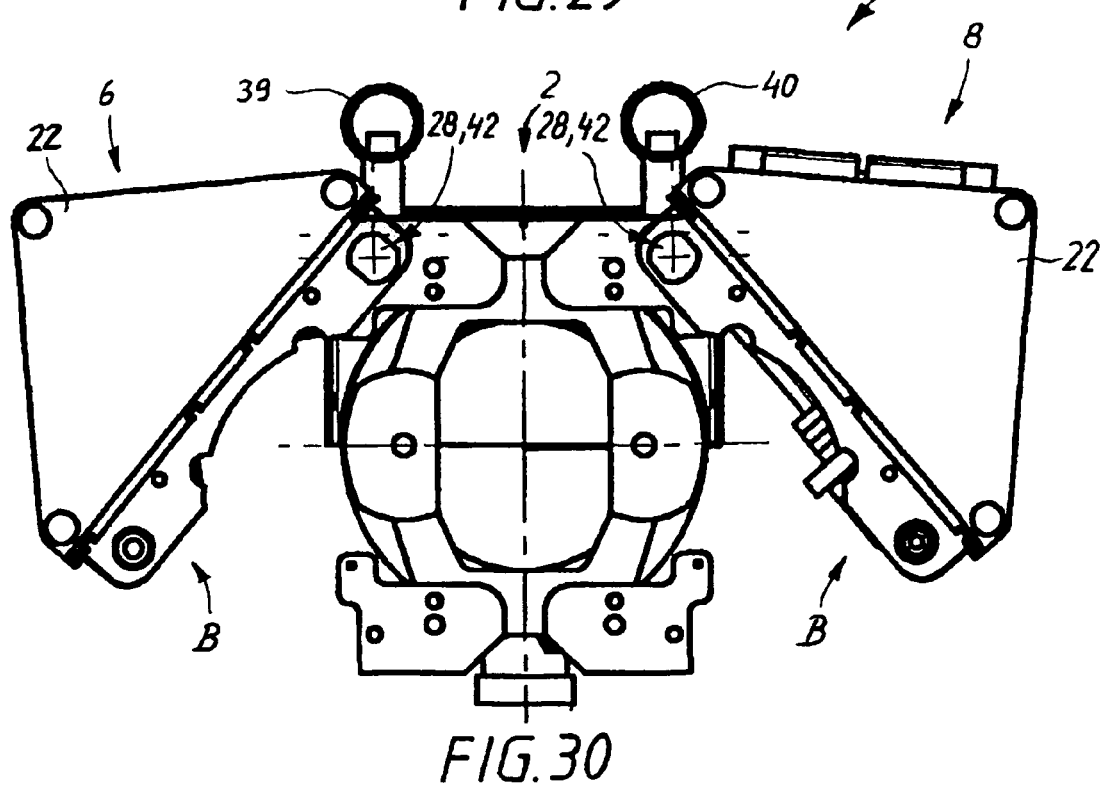
FIG. 30 shows the console according to FIG. 29, but with the columns open.

FIG. 30 shows the console 1 in an open position B according to FIG. 29, but with the columns 6,8 open.

Figure 31:
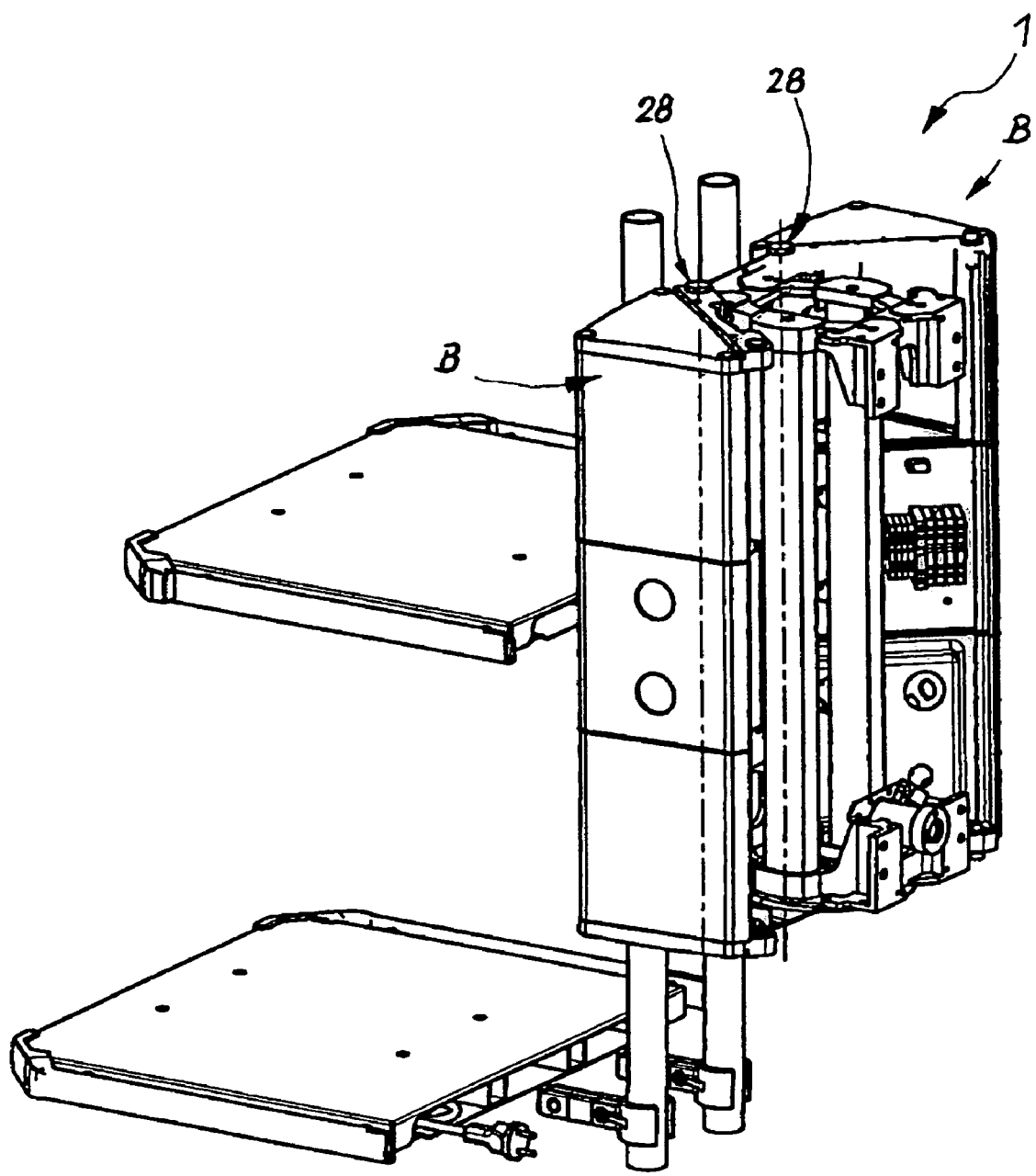
FIG. 31 shows the console according to FIG. 18, but with the columns open.

FIG. 31 shows the console 1 according to FIG. 18, but with the columns 6,8 open.

Figure 32:
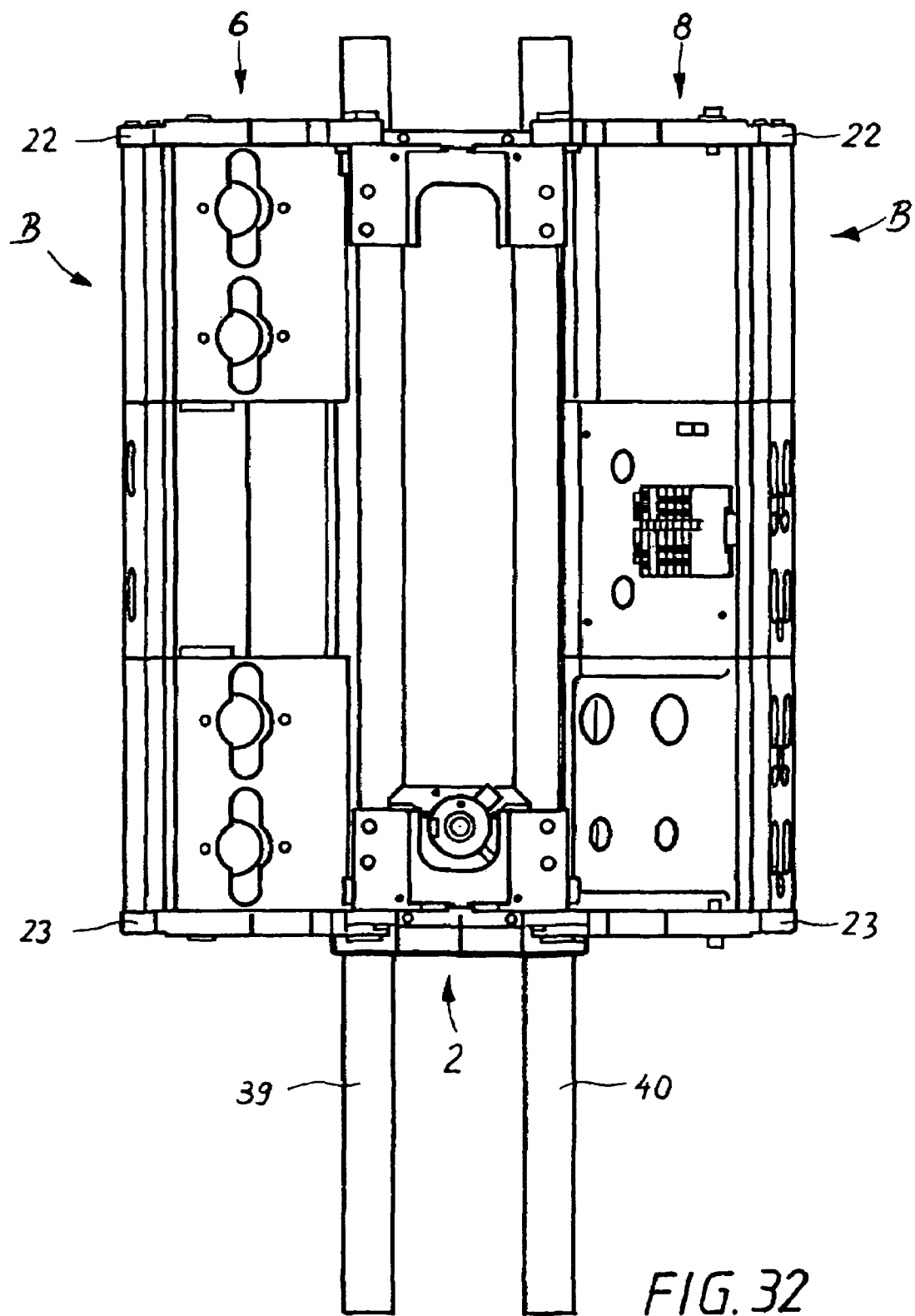
FIG. 32 shows a side view of the console according to FIG. 31 with a view of the open sides of the modules.

FIG. 32 shows a side view of the console 1 according to FIG. 31 with a view of the open side 25 of the modules 9.1-9.6.

Figure 33:
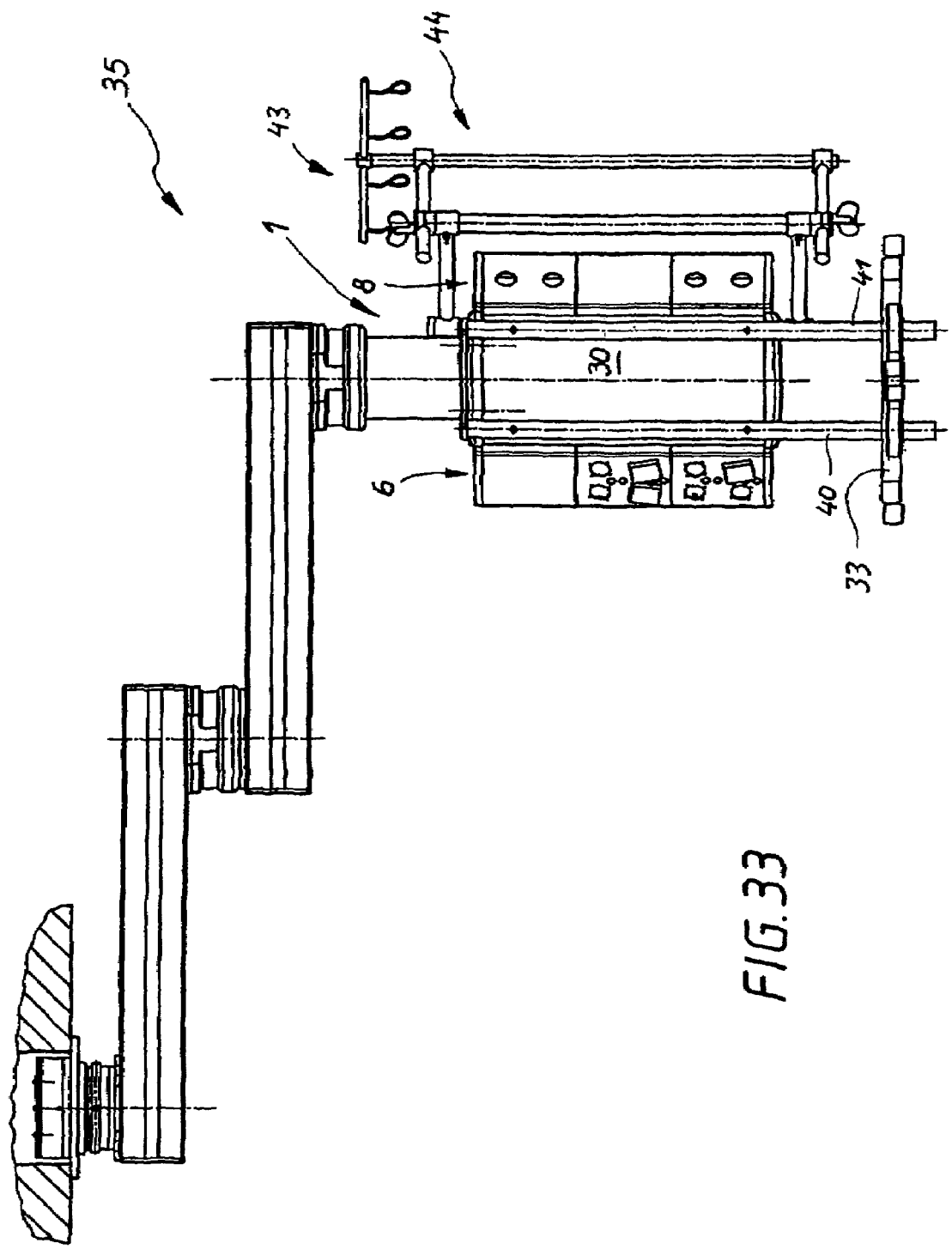
FIG. 33 shows a side view of the complete console on a ceiling mount.

FIG. 33 shows a side view of the complete console 1 on a ceiling mount 35 with a tray 33 and with a holder 43 for an infusion rod 44.

The modules 9.1-9.6 enable the accommodation of different country versions of current connectors (first jacks 3) (all types of common international connectors can be installed), different designs for gas supply boxes (second jacks 4), and various designs in communication and electronic connections (third jacks 4).

Due to the optional assembly of individual modules 9.1-9.6, which are separated from one another by separating plates 34 and partition plates (not shown in detail), a multitude of configuration options are obtained. The partition plates seal off each of the open sides 25 of the modules 9.1-9.6. Depending on the current safety regulations, an optional first, second, or third jack 3,4,29 can be provided to the user, preassembled in a first or second column 6,8 (including completely with a console 1 or optionally with a ceiling mount 35).

With the assistance of differently equipped modules 9.1-9.6, different equipment configurations of columns 6,8 can be realized in modular form, wherein a system of modules 9.1-9.6 with sections 10,10.1 of varying heights of extrusion profiles 11,11.1 can be provided. One or even two columns 6,8, mounted on the support frame 2, provide a medical-technological supply unit (console 1), which enables the user to have access to medical gases, electronic power supply, as well as communication technology. The design is specified by the user. The console 1 generally includes trays 32,33 as well as a holder 43 with infusion rods 44.

Structure of the columns 6,8:

The individual modules 9.1-9.6 are equipped with the corresponding jacks 3,4,29 and screwed into place. Corresponding lines 38 are connected and tested according to the quality specifications. Differently equipped modules 9.1-9.6 are aligned underneath each other and mounted with the assistance of separating plates 34. Multiple modules 9.1-9.6 are combined by a column 6,8, which is enclosed above and below with a cover plate 22,23. Threaded rods 24, including screw connections, connect the columns 6,8 with one another via form and force. This mounted unit is mounted on a support frame 2 to then be delivered as a customer-specific medical-technology supply unit (console 1) complete with casings 30, trays 32,33, and infusion rods 44. During service and inspections the columns 6,8 can be swiveled outward (position B) using the pivot bearing 27.

The separating plates 34 are an inserted part that is used to center the sawed off extrusion profiles 11,11.1 underneath one another. In addition, tolerances that result during sawing can be concealed. These separating plates 34 are also used to ensure gas-proof separation between two modules 9.1-9.6. This separating plate 34 provides an edge for this purpose, which is used as a contact surface for the partition plates.

Any number of modules 9.1-9.6 can be selected and the number is independent of the support system for the trays 32,33 and of the device carrier. Gas and electrical connections can be mounted on one side (e.g., towards the front or towards the back only). The triangular shape of the modules 9.1-9.6 is advantageous with respect to ergonomics, visual control, the routing of cables and hoses, as well as connection assignments. In addition, it is not necessary to specify the installation site in the front or in the back or on the left or right side. The electrical connections 3, gas connections 4, and communication connections 29 can be combined and installed as desired.

The modules 9.1-9.6 are provided in a modular system with sections 10,10.1 of varying heights, thereby resulting in the maximum number of combination options with modules 9.1-9.6 of different heights as well as in conjunction with different first, second, and third jacks 3,4,29.

The modules 9.1-9.6 are each optionally separated from one another by a separating plate 34, whereby the modules 9.1-9.6 can be separated, for example, to prevent gas leakage.

The open sides 25 are sealed off by a partition plate, whereby, for example, a gas-proof seal is obtained.

The console 1 is connected to a tripod stand, particularly to a ceiling mount 35, for positioning in the X-, Y-, and Z-direction.

Within the scope of the invention, it is also possible that only one column is to be provided on the support frame 2.

Reference List
1 Console
2 Support frame
3 First jack (power supply)
4 Second jack (gas supply)
5 First side
6 First column
7 Second side
8 Second column
9.1-9.6 1st-6th module
10 1st section/extrusion profile 11
10.1 2nd section/extrusion profile 11.1
11 1st extrusion profile
11.1 2nd extrusion profile
12 First side wall
13 Second side wall
14 Width/side wall 12,13
15 First end area
16 First channel
17 Second and area
18 Second channel
19 Edge area
20 Angle edge
21 Third channel
22 Upper cover plate
23 Lower cover plate
24 Threaded rod
25 Open side
26 Extension/cover plate 22,23
27 Pivot bearing
28 Joint
29 Third jack (communication connection)
30 Casing
31 Protective cover
32 First tray
33 Second tray
34 Separating plate
35 Ceiling mount
36.1 First opening
36.2 Second opening
36.3 Third opening
36.4 Fourth opening 37 Channel
38 Line
39 Holding rod
40 Holding rod
41 Borehole
42 Pivot joint receptacle
43 Holder
44 Infusion rod
45 Stand-connection receptacle
A Swiveled-in position
B Swiveled-out position The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm".

All documents cited in the Detailed Description of the Invention are, in relevant part, incorporated herein by reference; the citation of any document is not to be construed as an admission that it is prior art with respect to the present invention. To the extent that any meaning or definition of a term in this written document conflicts with any meaning or definition of the term in a document incorporated by reference, the meaning or definition assigned to the term in this written document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A console comprising a vertically arranged support frame and multiple jacks for medical-technological supply wherein,
   (a) a first vertically arranged column is arranged on a first side of the support frame, and a second vertically arranged column is arranged on a second opposing side, each comprising three modules positioned on top of each other;
   (b) the modules are optionally equipped with jacks;
   (c) the modules consist of sections of an extrusion profile;
   (d) the extrusion profile comprises a first and a second side wall of equal width at a right angle, wherein
   (e) a first channel is arranged in a first end area of the first side wall, a second channel is arranged in a second end area of the second side wall, and a third channel is arranged in an edge area of an angle edge, each with a circular cross-section;
   (f) all modules of the first and the second column are securely connected to an upper and a lower cover plate each with a threaded rod through all the channels;
   (g) the upper and lower cover plates each have an extension on the side of the modules that is open; the extensions all have a pivot bearing and are flexibly connected to the support frame via an individual joint to swivel the first and the second column away from the support frame; and
   (h) wherein the open sides of the modules are in a swiveled-in position A on a first or second side of the support frame.

2. A console according to claim 1, wherein, in addition to the jacks for medical-technological supply, optional jacks are provided for electronic communication.

3. A console according to claim 1, wherein the upper and lower cover plates are identical.

4. A console according to claim 1, wherein the modules are provided as a modular system with sections of varying heights.

5. A console according to claim 1, wherein the modules are separated from one another by a separating plate in each case.

6. A console according to claim 1, wherein the open sides are sealed off by a partition plate.

7. A console according to claim 1, wherein the console is connected to a tripod stand.

* * * * *